(No Model.) 2 Sheets—Sheet 1.
W. DONALD.
PROCESS OF MAKING CHLORIN.
No. 518,446. Patented Apr. 17, 1894.
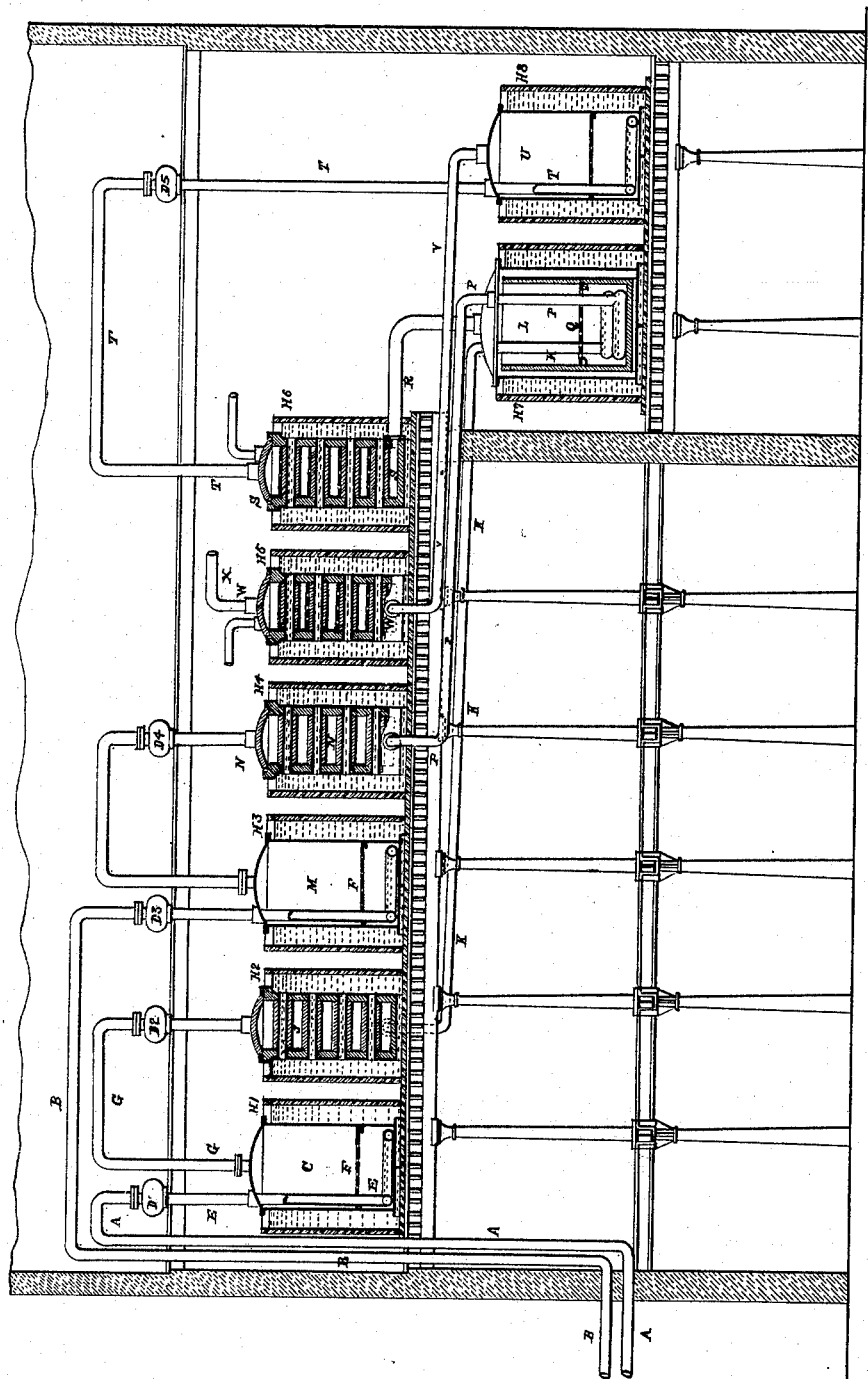
Witnesses
John Revell
George Baumann
Inventor
William Donald
By his Attorneys
Howson and Howson (No Model.) 2 Sheets—Sheet 2.
W. DONALD.
PROCESS OF MAKING CHLORIN.
No. 518,446. Patented Apr. 17, 1894.
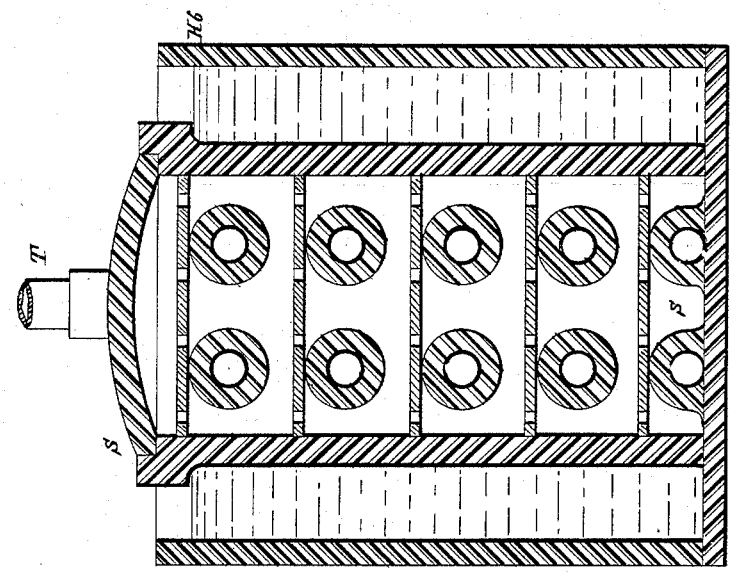
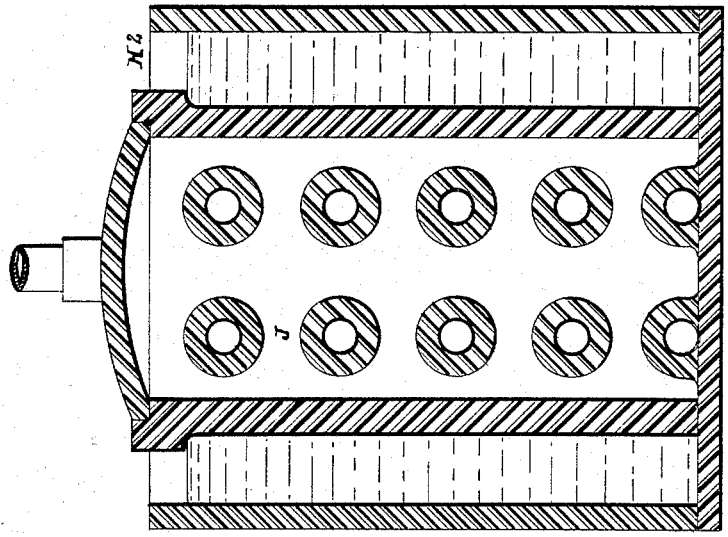

UNITED STATES PATENT OFFICE.

WILLIAM DONALD, OF SALTCOATS, SCOTLAND.

PROCESS OF MAKING CHLORIN.

SPECIFICATION forming part of Letters Patent No. 518,446, dated April 17, 1894.

Application filed October 6, 1891. Serial No. 407,832. (No specimens.) Patented in England April 11, 1890, No. 5,488; in Germany August 28, 1890, No. 57,122, and in France August 30, 1890, No. 207,959.

*To all whom it may concern:*

Be it known that I, WILLIAM DONALD, a subject of the Queen of Great Britain and Ireland, and a resident of Saltcoats, in the county of Ayr, Scotland, have invented certain Improvements in Obtaining Chlorin, (for which I have obtained a British patent, No. 5,488, dated April 11, 1890; a German patent, No. 57,122, dated August 28, 1890, and a French patent, No. 207,959, dated August 30, 1890,) of which the following is a specification.

My said invention has for its object the obtainment of chlorin in an improved and economical manner; and it consists of an advantageous modification of the series of processes described in the specification accompanying an earlier application for Letters Patent of the United States, filed by me September 29, 1891, Serial No. 407,137.

I obtain the chlorin from hydrochloric acid derived from common salt, or other suitable and conveniently obtainable chlorid, by well known means. I employ the hydrochloric acid in a dry gaseous state; and in the earlier stages of my improved processes, I operate on two separate streams of the acid gas, arranging, however, to have the two streams as nearly as possible equal in quantity.

In accompanying sheets of explanatory drawings I show by way of example an arrangement of apparatus which may be used in carrying out my invention, and in particularly describing the processes I will refer to the drawings, in which—

Figure 1, is a longitudinal vertical section of the apparatus. Fig. 2, is a vertical section of the vessel J, at right angles to the section taken in Fig. 1, and drawn to a larger scale; and Fig. 3, is a similar enlarged section of the vessel S.

Apparatus for generating and drying the hydrochloric acid gas is not shown in the drawings, but the two streams of gas are led from such apparatus through two pipes, A, B. One stream of hydrochloric acid gas is led by a pipe, A, through a vessel, C, hereinafter termed the decomposer, in which it is subjected to the combined action of strong nitric and sulfuric acids. The hydrochloric acid gas is by a pressure blower, D', forced to the bottom of the decomposer, C, the inlet pipe, E, extending to the bottom and terminating in a perforated coil, and the gas, which is further subdivided and distributed by passing through a perforated diaphragm, F, rises through the mixture of acids. In the decomposer, C, there are formed water, which is retained by the sulfuric acid, and a gaseous mixture of chlorin and nitric peroxid which gases pass from the top of the vessel by a pipe, G.

The contents of the decomposer, C, are kept at a low temperature by means of cold water or by preference brine of a temperature at or a little below the freezing point of water, the brine being made to circulate in a tank, H', in which the decomposer, C, is placed. The other vessels employed in the modification of the process now being described are kept at a low temperature by being placed in similar tanks, $H^2$, &c., similarly supplied with a cooling agent. From the decomposer, C, the mixture of chlorin and nitric peroxid is, by a pressure blower, $D^2$, made to pass down through a vessel, J, in which it is further cooled by brine or other suitable liquid which passes through pipes crossing the vessel as well as circulating round it. From the cooling vessel, J, the mixture of gases passes on through a pipe, K to a vessel, L, hereinafter termed an absorber.

The second stream of hydrochloric acid gas entering by a pipe, B, may pass directly into the absorber, L; it is however, for a purpose hereinafter explained, by preference made by pressure blowers, $D^3$, $D^4$, to pass through vessels, M, N, which are like the decomposer, C, and cooler, J, hereinbefore referred to, but which may at present be regarded as merely serving to cool the gas. From the vessel, N, the hydrochloric acid gas passes by the pipe, P, into the absorber, L, in which both inlet pipes K, P, extend to the lower part where they terminate in perforated coils under a perforated diaphragm, Q. In the absorber, L, there is put a quantity of nitric acid and water, which absorbs the nitric peroxid, nitric acid, and nitrous acid remaining, while the chlorin passes on in a nearly pure state.

In order to further purify the chlorin it is led from the absorber, L, by a pipe, R, into a vessel, S, in which it passes up through a series of perforated plates and encounters nitric acid which is supplied at the top and passes downward. The perforated plates rest upon the cross tubes in the vessel, S, through which tubes the cooling liquid circulates. Instead of the plates being simply perforated they may have short tubes projecting upward and covered with inverted cups as in apparatus for distilling or rectifying alcohol or ammonia; or any other suitable known scrubbing apparatus for bringing gases into close contact with liquids may be used. On leaving what may be termed the nitric-acid scrubber, S, the chlorin is conveyed by a pipe, T, and by means of a pressure blower, $D^5$, down to the bottom of a vessel, U, containing sulfuric acid up through which the chlorin passes in small streams or bubbles. The chlorin is next led from the vessel, U, by a pipe, V, to a scrubbing vessel, W, in which it is subjected to a final scrubbing action with sulfuric acid, this vessel being like the nitric-acid scrubber, S. The purified chlorin is led from the sulfuric-acid scrubber, W, by a pipe, X, to lime chambers or other apparatus in which it is to be applied.

When the mixture of nitric and sulfuric acids employed in the decomposer, C, has become weakened or nearly exhausted, a fresh strong mixture of the acids is put into the vessel, M, which then becomes a decomposer for operating on the hydrochloric acid gas supplied by the pipe, B. A stream of hydrochloric acid gas continues to pass by the pipe, A, but it now forms what may be distinguished as the second stream, and is acted on in the decomposer, C, only to the extent of utilizing as far as conveniently possible the remaining effective acids in that vessel a large portion of the gas passing on unaltered to the absorber, L. The actions in the vessels, C, and, M, are thus alternated and the acids employed are in consequence more completely utilized.

The nitrous acid formed in the absorber, L, may be oxidized into nitric acid in any well known manner by means of air or otherwise either in separate apparatus or by admitting air along with the hydrochloric acid gas or along with the mixture of chlorin and nitric peroxid at any convenient part of the apparatus. When this last mentioned mode of re-oxidizing the nitrous acid is adopted it will be advantageous to heat the gases passing through the vessels, J, N, and L, instead of cooling them, the other vessels, W, U, and S, being however kept cool. The action will take place at various temperatures; but I believe a temperature of about 30° centigrade will be found satisfactory in practice.

The various pipes and vessels used in carrying out my invention are made of or lined with lead or other suitable material not easily or rapidly acted on by the acids or gases passing through them.

What I claim is—

1. The process of obtaining chlorin which consists in subjecting hydrochloric acid gas to a mixture of nitric and sulfuric acids, and subjecting the resulting gaseous mixture of chlorin and nitric peroxid together with additional hydrochloric acid gas to nitric acid and finally to sulfuric acid, substantially as set forth.

2. The process of obtaining chlorin, which consists in subjecting hydrochloric acid gas to a mixture of nitric and sulfuric acids, and subjecting the resulting gaseous mixture of chlorin and nitric peroxid together with additional hydrochloric acid gas and air to nitric acid and finally to sulfuric acid, substantially as set forth.

In testimony whereof I have signed my name to this specification in the presence of two subscribing witnesses.

WILLIAM DONALD.

Witnesses:
 EDMUND HUNT,
 DAVID FERGUSON.